US012657583B2

(12) United States Patent
Kim et al.

(10) Patent No.: US 12,657,583 B2
(45) Date of Patent: Jun. 16, 2026

(54) MULTI BLOCKCHAIN NETWORK SYSTEM WITHOUT NATIVE CRYPTOCURRENCY BASED ON AGGREGATED PROOF-OF-TRANSACTION CONSENSUS

(71) Applicant: BLOCKCHAIN LABS INC., Seoul (KR)

(72) Inventors: Yong Tae Kim, Seoul (KR); Byung Wan Lim, Seoul (KR)

(73) Assignee: BLOCKCHAIN LABS INC., Seoul (KR)

( * ) Notice: Subject to any disclaimer, the term of this patent is extended or adjusted under 35 U.S.C. 154(b) by 98 days.

(21) Appl. No.: 18/621,343

(22) Filed: Mar. 29, 2024

(65) Prior Publication Data

US 2024/0330915 A1      Oct. 3, 2024

(30) Foreign Application Priority Data

Mar. 31, 2023      (KR) ........................ 10-2023-0042651

(51) Int. Cl.
*G06Q 20/38* (2012.01)
*G06Q 20/40* (2012.01)
(52) U.S. Cl.
CPC ....... *G06Q 20/389* (2013.01); *G06Q 20/3825* (2013.01); *G06Q 20/401* (2013.01)
(58) Field of Classification Search
CPC . G06Q 20/389; G06Q 20/3825; G06Q 20/401
USPC .......................................................... 705/75
See application file for complete search history.

(56) References Cited

U.S. PATENT DOCUMENTS

| | | | |
|---|---|---|---|
| 2019/0058581 A1 | 2/2019 | Wood et al. | |
| 2020/0167773 A1* | 5/2020 | Cervenka | H04L 9/0643 |
| 2021/0004777 A1* | 1/2021 | Kim | G06Q 30/0185 |
| 2023/0385814 A1* | 11/2023 | Gauthier | H04L 9/3255 |
| 2024/0333521 A1* | 10/2024 | Kaplan | H04L 9/3239 |
| 2025/0190958 A1* | 6/2025 | Park | G06Q 20/381 |
| 2025/0209448 A1* | 6/2025 | Huang | H04L 9/32 |

OTHER PUBLICATIONS

"InfraBlockchain Technical White Paper," Blockchain Labs Inc., v. 2.4, Aug. 31, 2020, total 37 pages, https://infrablockchain.net/documents/InfraBlockchain_Technical_White_Paper_Version_2_4_ENG_202008.pdf.

* cited by examiner

*Primary Examiner* — Courtney P Jones
(74) *Attorney, Agent, or Firm* — Studebaker Brackett PLLC

(57)      ABSTRACT

Disclosed is a multi-blockchain network comprising an infra relay chain, a plurality of validators determining governance of the multi-blockchain network and a plurality of parachains including a first parachain and a second parachain connected to the infra relay chain, wherein the first parachain is configured to generate a first transaction including a vote for a first blockchain account and having a first fee, wherein the second parachain is configured to generate a second transaction including a vote for a second blockchain account and having a second fee, and wherein the infra relay chain is configured to elect the plurality of validators based on the votes for the first and second blockchain accounts and the first and second fees. In addition to this, various embodiments grasped through the specification are possible.

8 Claims, 4 Drawing Sheets first transaction transaction fee: 10,000 T1 transaction vote: account Q

31

32 second transaction transaction fee: 5,000 T2 transaction vote: account P

MULTI BLOCKCHAIN NETWORK SYSTEM WITHOUT NATIVE CRYPTOCURRENCY BASED ON AGGREGATED PROOF-OF-TRANSACTION CONSENSUS

CROSS-REFERENCE TO RELATED APPLICATION

This application claims priority to Korean Patent Application No. 10-2023-0042651 filed on Mar. 31, 2023, and all the benefits accruing therefrom under 35 U.S.C. § 119, the contents of which are incorporated by reference in their entirety.

BACKGROUND

The present disclosure relates to a multi-blockchain network platform technology and consensus algorithm that maintains the platform.

A blockchain network is a distributed network that requires a consensus algorithm to ensure the reliability of its system. Existing consensus algorithms include the Proof of Work (PoW) method, where an entity with high computing power has the authority to produce blocks, and the Proof of Stake (POS) method, where an entity that owns a large amount of virtual currency issued on the blockchain network has the authority to produce blocks.

Meanwhile, multi-blockchain network technology is being developed to improve the issues of slow speed or excessive maintenance costs of a single blockchain network. In a multi-blockchain network, multiple blockchain networks providing various services are connected in parallel. A multi-blockchain network consists of the multiple blockchain networks and a central blockchain network that connects them.

SUMMARY

Existing consensus algorithms essentially require the existence of cryptocurrencies because they utilize economic rewards to provide cryptocurrencies to block producers. Blockchain network users also have to pay fees for using the blockchain network in the cryptocurrency. Since the price of cryptocurrencies constantly fluctuates, blockchain network users have difficulty predicting usage fees and have to pay different fees for the same transaction each time, which is problematic.

Additionally, existing consensus algorithms have various inherent problems. For example, the Proof of Work method causes severe power waste due to competitive energy consumption among block producers, and the Proof of Stake method may allow a small number of block producers with large stakes to monopolize the authority to determine the governance of the blockchain network. To solve these problems, a consensus algorithm called Proof of Transaction has been proposed. The Proof of Transaction method includes a voting function in the transactions generated by users actually providing services based on the blockchain network. Therefore, since users generating transactions can determine validators through voting, blockchain service providers generating many meaningful transactions will determine the validators.

The various embodiments disclosed in this document propose a blockchain network that applies an integrated Proof of Transaction consensus algorithm in a multi-blockchain network. Additionally, they propose a blockchain network where stable tokens pegged to legal currencies circulate instead of highly volatile cryptocurrencies.

In accordance with an exemplary embodiment of the present invention, a multi-blockchain network, the multi-blockchain network comprising: an infra relay chain, a plurality of validators determining governance of the multi-blockchain network and a plurality of parachains including a first parachain and a second parachain connected to the infra relay chain, wherein the first parachain is configured to generate a first transaction including a vote for a first blockchain account and having a first fee, wherein the second parachain is configured to generate a second transaction including a vote for a second blockchain account and having a second fee, and wherein the infra relay chain is configured to elect the plurality of validators based on the votes for the first and second blockchain accounts and the first and second fees.

BRIEF DESCRIPTION OF THE DRAWINGS

Exemplary embodiments can be understood in more detail from the following description taken in conjunction with the accompanying drawings, in which.

With regard to the description of the drawings, the same or similar reference numerals may be used for the same or similar components.

DETAILED DESCRIPTION OF EMBODIMENTS

Hereinafter, various embodiments of the present disclosure will be described with reference to the accompanying drawings. However, this is not intended to limit the present disclosure to specific embodiments, and should be understood to include various modifications, equivalents, and/or alternatives of the embodiment of the present disclosure.

Figure 1:
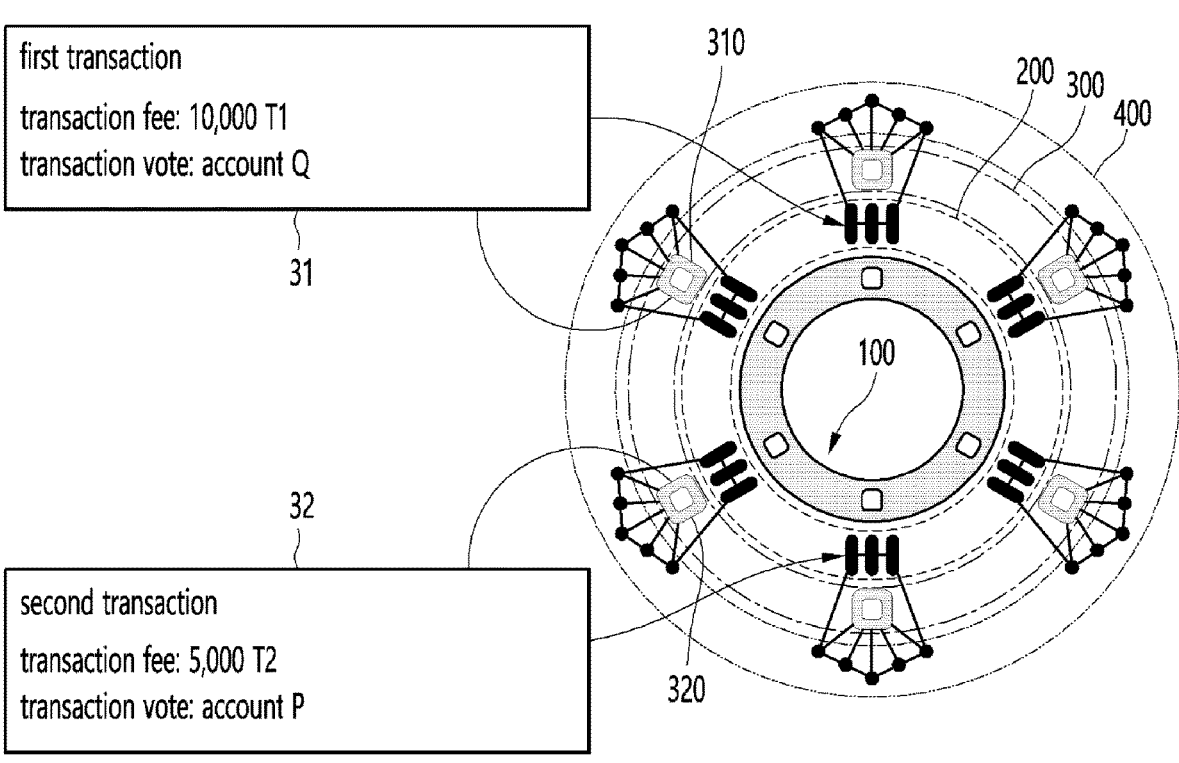
FIG. 1 is a diagram for explaining a structure of a multi-blockchain network and aggregated proof-of-transaction consensus applied thereto according to an embodiment.
Figure 2:
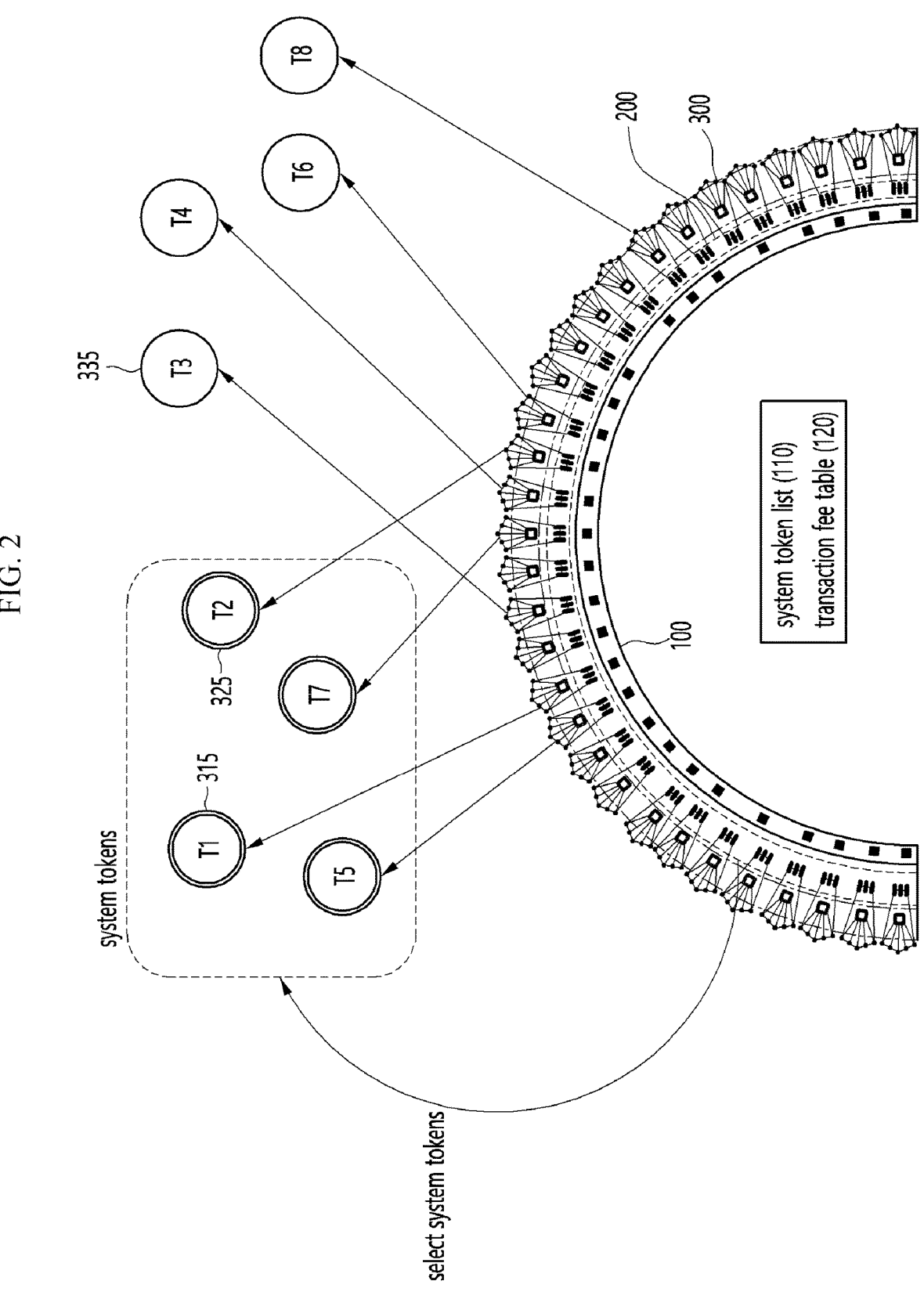
FIG. 2 is a diagram for explaining a concept of a system token on a multi-blockchain network according to an embodiment.
Figure 3:
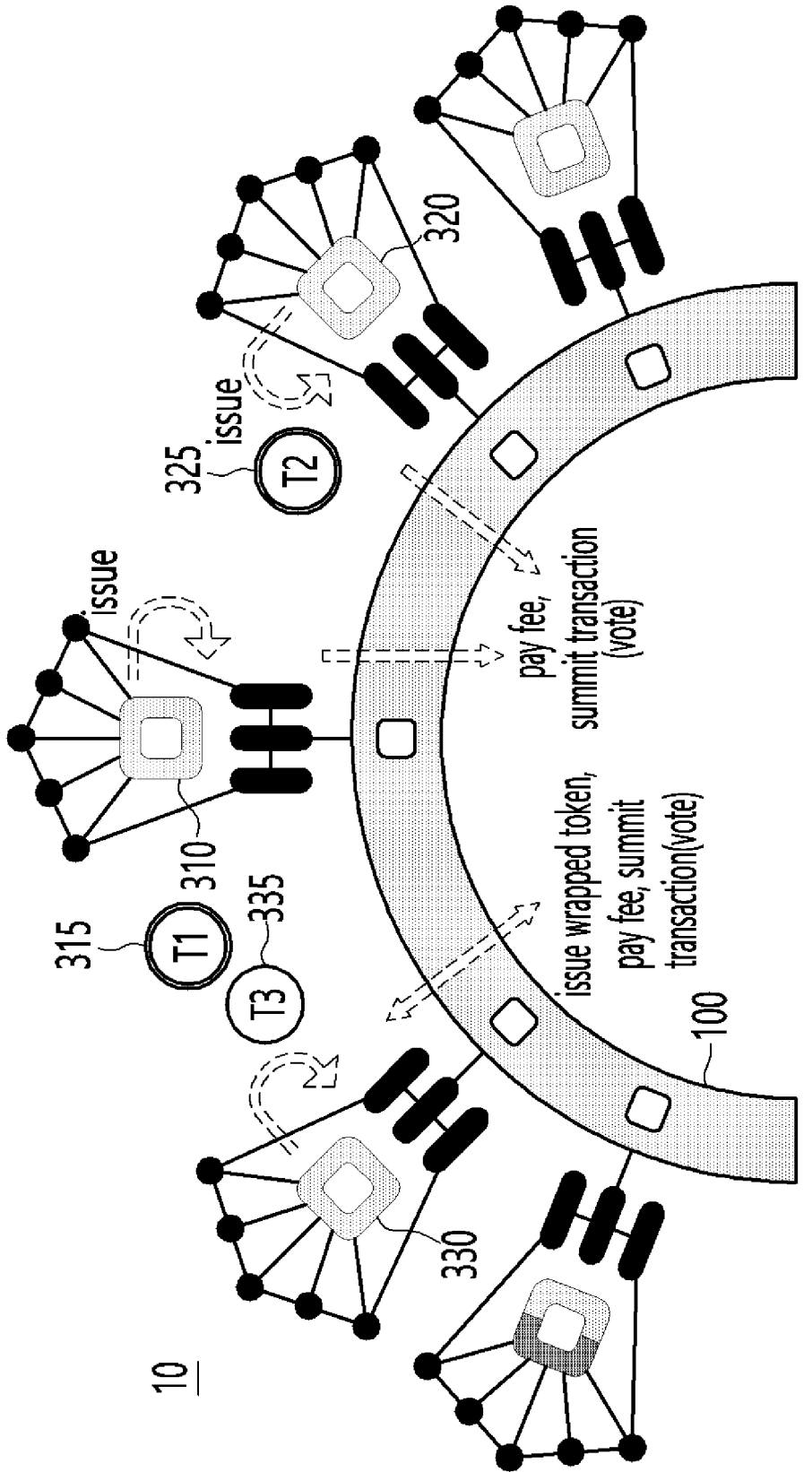
FIG. 3 is a diagram for explaining token issuance operation of a plurality of parachains according to an embodiment.

FIG. 1 is a diagram for explaining a structure of a multi-blockchain network 10 and aggregated proof-of-transaction consensus applied thereto according to an embodiment. FIG. 2 is a diagram for explaining a concept of a system token on a multi-blockchain network according to an embodiment. FIG. 3 is a diagram for explaining token issuance operation of a plurality of parachains according to an embodiment. Hereinafter, the structure and operation of the multi-blockchain network 10 will be described with reference to FIGS. 1 to 3.

Referring to FIG. 1, the multi-blockchain network 10 according to one embodiment includes an infra relay chain 100, a plurality of validators 200, a plurality of parachains 300, and a plurality of collators 400.

The infra relay chain 100 can be understood as the main chain connecting the plurality of parachains 300. The infra relay chain 100 verifies transactions generated in parallel by the plurality of parachains 300 in the multi-blockchain network 10, and guarantees finality for blocks including the transactions. The plurality of computing devices included in the infra relay chain 100 can communicate with each other through a distributed network, and can communicate with the plurality of parachains 300 connected in parallel to the infra relay chain 100.

The plurality of parachains 300 can be understood as independent blockchain networks designed for different purposes. The plurality of parachains 300 can each be allocated slots on the infra relay chain 100. The plurality of validators 200 can permit a specific parachain to utilize the infra relay chain 100 and allocate a slot on the infra relay chain 100 to that parachain. The plurality of parachains 300 operate in compliance with the governance determined by the plurality of validators 200 of the infra relay chain 100.

The plurality of validators 200 can be understood as the entities operating the infra relay chain 100. The plurality of validators 200 of the infra relay chain 100 can perform the role of verifying and finalizing blocks generated by the plurality of parachains 300. The plurality of validators 200 can determine the governance of the infra relay chain 100. Governance may include all matters related to the operation of the infra relay chain 100.

The plurality of validators 200 elected in the infra relay chain 100 can finalize blocks generated by all the plurality of parachains 300 connected to the infra relay chain 100, and maintain the security of the entire multi-blockchain network 10 (shared security). Since the plurality of parachains 300 operating individual services do not need to set up validators themselves to maintain the security of their own blockchain networks when connected to the infra relay chain 100, they can maintain a stable network at a low cost.

The plurality of collators 400 can be understood as the entities operating the parachains. Each of the plurality of parachains 300 has a plurality of collators 400. The plurality of collators 400 can execute and collect transactions generated in each parachain, and generate blocks including the collected transactions. The plurality of collators 400 can transmit the generated blocks to the infra relay chain 100, and the plurality of validators 200 can perform a verification process for the blocks.

In various embodiments, the infra relay chain 100 and the plurality of parachains 300 can each be understood as separate blockchain networks. The blockchain network disclosed in this document can be understood as a distributed network including a plurality of nodes connected to each other through a network. Each of the plurality of nodes can be understood as an independent computing device. A computing device may include a processor controlling the computing device, a memory storing instructions for performing operations on the multi-blockchain network 10, and a communication interface for communicating with other nodes. Each of the plurality of validators 200 and the plurality of collators 400 can be understood as an independent computing device as one node. In the multi-blockchain network 10, tokens, smart contracts, and chain functions can interoperate between the plurality of parachains 300 and the infra relay chain 100 through an XCM (Cross Consensus Message) based blockchain interoperability common protocol.

Referring to FIG. 2, the plurality of validators 200 can determine a system token that can be used as a transaction fee for the multi-blockchain network 10 among tokens issued by the plurality of parachains 300. For example, the plurality of validators 200 can determine the system token based on whether a token issued by a parachain is guaranteed by a trusted institution (e.g., government agency, bank, company) (hereinafter, trusted institution), the scale of the trusted institution, etc. Unlike existing blockchain networks (e.g., Ethereum, Polkadot, etc.), the infra relay chain 100 does not have its own virtual currency, so it can have governance that allows usage fees for the multi-blockchain network 10 to be paid with tokens issued by parachains. The plurality of validators 200 can select the system token from among the many tokens issued by the infra relay chain 100 or parachains by their consensus (e.g., agreement by ⅔ of the validators). The multi-blockchain network 10 can be operated based on a plurality of system tokens.

In various embodiments, the plurality of parachains 300 can freely issue tokens. The plurality of validators 200 can select system tokens from among the tokens issued by the various parachains. Referring to FIG. 2, an example is shown where eight parachains from the plurality of parachains 300 have issued a total of eight tokens (T1 to T8). The plurality of validators 200 have selected four tokens (T1, T2, T5, T7) from the total of eight tokens as the system tokens.

In one embodiment, the infra relay chain 100 can manage a system token list 110. The system token list 110 can be understood as a list of tokens selected as system tokens. The system token list 110 may include information about parachain identifiers, parachain token identifiers, and system token weights. The parachain identifier is the identifier of the parachain issuing the system token, and the parachain token identifier can be understood as the identifier of the token selected as the system token within the corresponding parachain.

The system token weight can be understood as a weight value to reflect the exchange rates of the legal currencies guaranteeing the different system tokens. The tokens selected as system tokens may have different system token weights set based on the exchange rates. The system token weights can be designated by consensus of the plurality of validators 200. The system token weights can be determined based on real-time exchange rate information. If the criteria for setting the system token weight is set to the US dollar, the exchange rate against the US dollar can be set as the system token weight.

In various embodiments, since real-time exchange rate information is information external to the blockchain network, a node acting as an oracle among the plurality of validators 200 can update the exchange rate information within the multi-blockchain network 10 at a predetermined period (e.g., every 4-5 hours).

In various embodiments, the plurality of parachains 300 can freely issue different tokens respectively. For example, only stable tokens pegged to legal currencies (e.g. KRW, USD, PHP, etc.) may be allowed as system tokens on the multi-blockchain network 10. And the system tokens may be enforced to have their redemption guaranteed by trusted institutions.

This can be understood as the governance of the multi-blockchain network 10 determined by the plurality of validators 200. Such governance enables parachains to make transaction fees predictable and allows for stable operation of the blockchain network based on legal currencies.

The following Table 1 is an example of the system token list 110. A total of 3 system tokens are exemplified in the list.

TABLE 1

| No | parachain identifier | parachain token identifier | system token weight |
|----|----------------------|----------------------------|---------------------|
| 1  | A                    | 59                         | 1.00000             |
| 2  | B                    | 30                         | 0.00076             |
| 3  | E                    | 12                         | 0.65002             |

In one embodiment, the infra relay chain 100 can manage a fee table 120. The fee table 120 may include fee information for transactions on the multi-blockchain network 10. The transaction fees can be determined by consensus of the plurality of validators 200. For example, the infra relay chain 100 can manage a fee table 120 containing transaction fee information determined by consensus of more than ⅔ of the plurality of validators 200. The fee table 120 may include prices set for each transaction type (e.g., token transfer) performed on the multi-blockchain network 10, based on legal currencies. In another example, fees for transactions not included in the fee table 120 can be dynamically determined based on the usage of computing resources.

Referring back to FIG. 1, the plurality of validators 200 can be elected by the votes included in transactions (e.g., first transaction 31, second transaction 32) occurring in the infra relay chain 100 and the plurality of parachains 300. Transactions occurring in the multi-blockchain network 10 may include a vote for a specific blockchain account (a vote to select validators). The votes included in the transactions generated from the infra relay chain 100 and the plurality of parachains 300 can be collected by the infra relay chain 100, and the infra relay chain 100 can elect the plurality of validators 200 based on the collected votes.

The first parachain 310 included in the plurality of parachains 300 generates a first transaction 31 including a vote for a first blockchain account (e.g., account Q) and having a first fee. The second parachain 320 included in the plurality of parachains 300 generates a second transaction 32 including a vote for a second blockchain account (e.g., account P) and having a second fee. The infra relay chain 100 can collect the votes for the first and second blockchain accounts from the first transaction 31 and the second transaction 32.

Each transaction may have a different transaction fee. For example, the infra relay chain 100 can calculate the number of votes for a specific blockchain account based on the fee of each transaction, and elect a predetermined number of validators 200 in the order of high vote counts according to the accumulated votes. For instance, the infra relay chain 100 can elect the plurality of validators 200 based on the accumulated votes at a predetermined period.

In one embodiment, the infra relay chain 100 can assign a higher weight to the vote of a transaction with a higher transaction fee. Referring to FIGS. 1 and 3, for example, the first parachain 310 can issue a first token 315 (T1), and the second parachain 320 can issue a second token 325 (T2). Also, the transaction fee (hereinafter, the first fee) of the first transaction 31 is 10,000 T1, and the transaction fee (hereinafter, the second fee) of the second transaction 32 is 5,000 T2.

Meanwhile, the first token 315 and the second token 325 issued by the first parachain 310 and the second parachain 320, respectively, can be understood as system tokens. This is because both the first token 315 and the second token 325 can be used to pay transaction fees. The first token 315 and the second token 325 can be understood to have been selected as system tokens of the multi-blockchain network 10 by the plurality of validators 200.

In one embodiment, the first token 315 may have a first system token weight, and the second token 325 may have a second system token weight. For example, if the first token 315 is pegged to a first legal currency and the second token 325 is pegged to a second legal currency, the first system token weight and the second system token weight may be set based on the first legal currency and the second legal currency.

For instance, if the first token 315 is pegged to the US dollar and the second token 325 is pegged to the Korean won, the first system token weight may be set to 1.0000, and the second system token weight may be set to 0.00076 (assuming the system token weights are set based on the US dollar, and 1 USD is approximately 1,300 KRW).

The infra relay chain 100 can collect votes for the first blockchain account based on the first system token weight and the first fee, and collect votes for the second blockchain account based on the second system token weight and the second fee. The infra relay chain 100 can elect the plurality of validators 200 based on the collected results.

In one embodiment, the infra relay chain 100 can calculate the first vote count for the first blockchain account by multiplying the first system token weight by the first fee. The infra relay chain 100 can calculate the second vote count for the second blockchain account by multiplying the second system token weight by the second fee. The infra relay chain 100 can add the first vote count and the second vote count to the previously accumulated vote count, and elect the plurality of validators 200 at predetermined periods.

In FIG. 1, the first fee is 10,000 T1, and the second fee is 5,000 T2. For example, when the first parachain 310 issues the first token 315, 10,000 T1 can be set to have a value of 1 USD, and when the second parachain 320 issues the second token 325, 10,000 T2 can be set to have a value of 1,000 KRW. Then, it can be seen that the first fee is 1 USD and the second fee is 500 KRW. In this case, the infra relay chain 100 can calculate the vote count for the first blockchain account (Q) as 1 USD (first fee)*1 (first system token weight)=1 vote. The infra relay chain 100 can calculate the vote count for the second blockchain account (P) as 500 KRW (second fee)*0.00076=0.38 votes.

In other words, the infra relay chain 100 can collect votes for the first blockchain account (Q) based on the first fee and the first system token weight of the first transaction 31. The infra relay chain 100 can collect votes for the second blockchain account (P) based on the second fee and the second system token weight of the second transaction 32. The infra relay chain 100 can collect voting items from all transactions generated on the multi-blockchain network 10, and periodically elect the plurality of validators 200 based on the collected results.

In various embodiments, the plurality of parachains 300 may have different voting weights (hereinafter referred to as parachain weights). The plurality of validators 200 can determine the parachain weights by consensus. The infra relay chain 100 can collect votes based on the transaction fee, the system token weight, and the parachain weight of the parachain that generated the transaction. For example, assuming that the parachain weight of the first parachain 310 is 1 and the parachain weight of the second parachain 320 is 3, the vote count for the first blockchain account (Q) remains the same at 1 vote, but the vote count for the second blockchain account (P) can be calculated as 0.38*3=1.14 votes.

In various embodiments, the infra relay chain 100 may be configured to assign a higher weight to recently generated transactions (hereinafter referred to as time weight). Therefore, the time weight of a transaction generated earlier in time is set relatively low, while the time weight of a transaction generated later in time is set relatively high. The infra relay chain 100 can collect votes based on the transaction fee, the system token weight, and the time weight of the transaction. For example, if the infra relay chain 100 selects validators based on the cumulative vote count, even if new users join the multi-blockchain network 10 and vote for new validators, the status of the validators may be maintained due to the large number of previously accumulated votes. In this case, the time weight can be used to reasonably reflect the votes of new entrants.

For instance, the time weight can be set to double every year. If the first transaction 31 is a transaction generated in 2023, and the second transaction 32 is a transaction generated in 2024, the collected vote count for the first blockchain account (Q) remains the same at 1 vote, but the vote count for the second blockchain account (P) can be calculated as 0.38*2=0.76 votes.

In various embodiments, when votes are collected through transactions, the infra relay chain 100 can calculate the vote count based on the transaction fee, the system token weight, the parachain weight, and the time weight. The infra relay chain 100 can add the calculated vote count to the previously accumulated vote count. The infra relay chain 100 can elect the plurality of validators 200 based on the previously accumulated vote count at predetermined periods.

Referring to FIG. 3, the plurality of parachains 300 may further include a third parachain 330. If the third parachain 330 is a parachain that has not issued a system token, the third parachain 330 must pay transaction fees using system tokens issued by other parachains.

The third parachain 330 can use any one of the plurality of system tokens. For example, if the third parachain 330 decides to use the first token 315 of the first parachain 310, the third parachain 330 must transfer the required amount of the first token for using the multi-blockchain network 10 to the blockchain account of the third parachain 330 and use it. To this end, the third parachain 330 can issue and use a wrapped token of the first token 315.

In one embodiment, a wrapped token can be understood as a token corresponding to a system token issued by another parachain. A parachain that does not have a system token can issue a wrapped token of the system token and pay transaction fees with the wrapped token. For example, the third parachain 330 can issue a predetermined amount of a third token 335 as a wrapped token of the first token 315. At this time, the first parachain 310 can burn or lock up the first token 315 corresponding to the predetermined amount through a contract. Therefore, the total issuance amount of the first token 315 is maintained. The third parachain 330 can obtain permission from the plurality of validators 200 for issuing the third token as a wrapped token.

For example, the third parachain 330 can generate a third transaction that includes a vote for a third blockchain account and has a third fee. The third parachain 330 can pay the third fee using the third token. At this time, the infra relay chain 100 can collect the vote for the third blockchain account based on the first system token weight of the first token 315 and the third fee.

Figure 4:
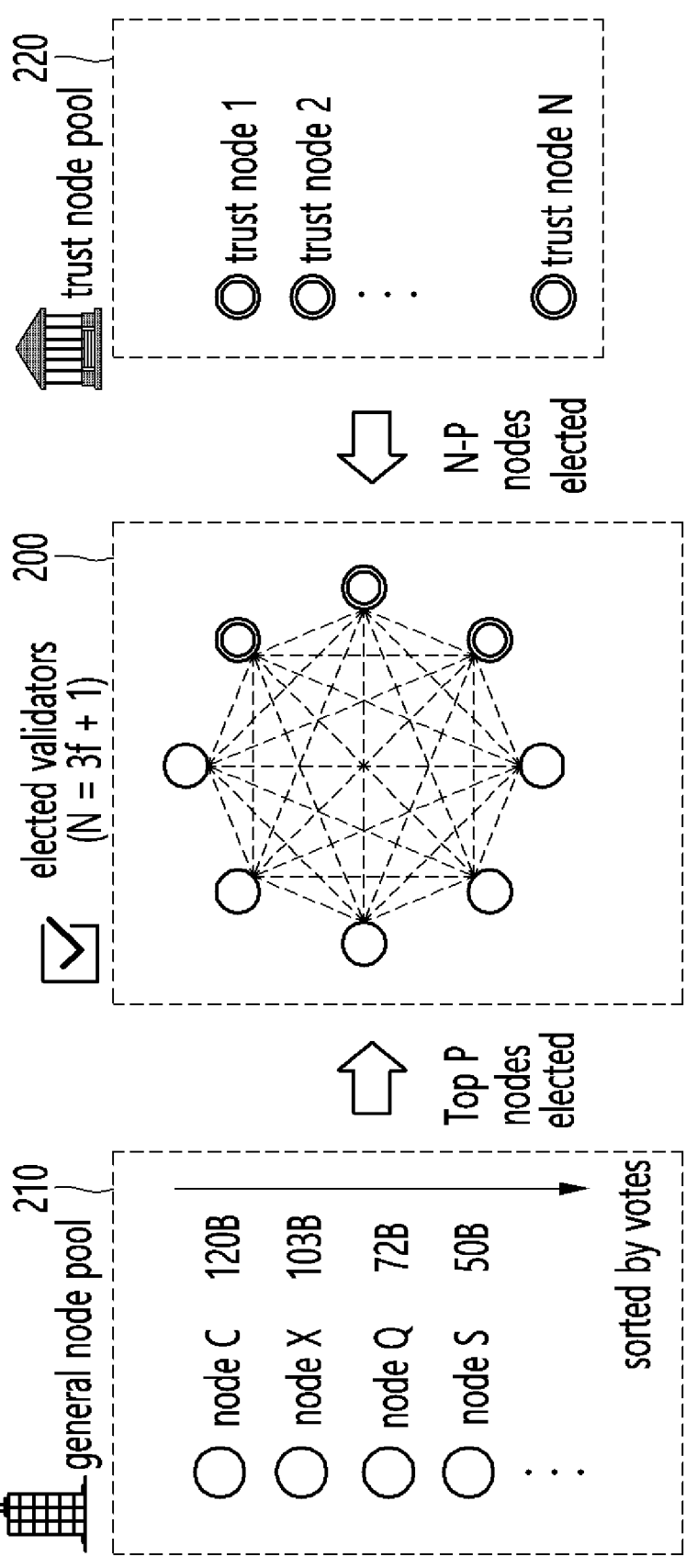
FIG. 4 is a diagram for explaining a method of setting up a plurality of validators according to an embodiment.

FIG. 4 is a diagram for explaining a method of setting up a plurality of validators 200 according to an embodiment. Referring to FIG. 4, the infra relay chain 100 can accumulate and aggregate votes submitted through transactions in real-time. Based on the accumulated and aggregated results, the infra relay chain 100 can elect top nodes that received many votes as the plurality of validators 200 at regular periods.

In various embodiments, the multi-blockchain network 10 may include a general node pool 210 and a trust node pool 220. The general node pool 210 can be understood as a node pool that receives transaction votes. The trust node pool 220 can be understood as a node pool operated by pre-designated trusted institutions. The N validators 200 can consist of the top P nodes with high voting rates from the general node pool 210 and N-P nodes included in the trust node pool 220. In this way, the infra relay chain 100 can be operated in a hybrid method of public and permissioned.

In various embodiments, by electing pre-designated trust nodes as validators, the stability and reliability of the multi-blockchain network 10 can be enhanced. Furthermore, by adjusting the composition of validators, various configurations and flexible governance structures can be established, such as a fully closed (consortium) type composed only of trust nodes, a hybrid type with a mixture of trust nodes and general nodes, and a fully public type composed only of general nodes.

The node (computing device) constituting the multi-blockchain network according to the various embodiments disclosed in this document can be various types of devices. The computing device may include, for example, a portable communication device (e.g., smartphone), a computer device, a portable multimedia device, a wearable device, or a home appliance. The computing device according to the embodiments of this document is not limited to the aforementioned devices.

Various embodiments of this document and terms used therein are not intended to limit the technical features described in this document to specific embodiments, and should be understood to include various modifications, equivalents, or alternatives of the embodiments. In relation to the description of the drawings, similar reference numerals may be used for similar or related components. The singular form of a noun corresponding to an item may include one item or a plurality of items, unless the relevant context clearly dictates otherwise. In this document, each of phrases such as "A or B", "at least one of A and B", "at least one of A or B", "A, B or C", "at least one of A, B and C", and "at least one of A, B, or C" may include all possible combinations of items listed together in the corresponding phrase among those phrases. Terms such as "first", "second", "firstly", or "secondly" may simply be used to distinguish a corresponding component from other corresponding components, and do not limit the corresponding components in other respects (e.g., importance or order). In this document, if a certain (e.g., first) element is referred to as being "connected" or "coupled" with or without the terms "functionally" or "communicatively" to another (e.g., second) component, it means that the certain component can be connected to the other component directly (e.g., in a wired manner), wirelessly, or through a third component.

The various embodiments of this document may be implemented as software comprising one or more instructions stored on a machine-readable storage medium (e.g., computing device). For example, a processor of a machine (e.g., computing device) may invoke at least one instruction among the one or more instructions stored in the storage medium and execute it. This enables the machine to operate to perform at least one function according to the invoked at least one instruction. The one or more instructions may include code generated by a compiler or code that can be executed by an interpreter. The machine-readable storage medium may be provided in the form of a non-transitory storage medium. Here, the term "non-transitory" only means that the storage medium is a tangible device and does not include a signal (e.g., electromagnetic wave), and this term does not distinguish between cases where data is stored on the storage medium semi-permanently or temporarily.

According to various embodiments, each component (e.g., module or program) of the components described above may include one or a plurality of entities. According to various embodiments, one or more components among the components described above or operations may be omitted, or one or more other components or operations may be added. Alternatively or additionally, a plurality of components (e.g., modules or programs) may be integrated into one component. In this case, the integrated component may perform one or more functions of each component of the plurality of components identically or similarly to those functions performed by a corresponding component among the plurality of components prior to the integration. According to various embodiments, operations performed by modules, programs, or other components may be executed sequentially, in parallel, iteratively, or heuristically, or one or more of the operations may be executed in a different order or omitted, or, one or more other operations may be added.

According to the embodiments disclosed in this document, through the consensus algorithm of the aggregated proof-of-transaction applied on the multi-blockchain network, validators can be elected by transactions generated by users who provide actual services on the blockchain network.

A node operated by a service that heavily uses the multi-blockchain network, that is, generates many transactions, can be elected as a validator. Furthermore, that service can participate in governance and earn revenue from legal currency-based transaction fees occurring on the multi-blockchain network. In addition, various effects that are directly or indirectly identified through this document can be provided.

What is claimed is:

1. A multi-blockchain network, the multi-blockchain network comprising:

an infra relay chain;

a plurality of parachains including a first parachain and a second parachain, which are connected to the infra relay chain, wherein the first parachain is configured to issue a first token pegged to a first legal currency, and the second parachain is configured to issue a second token pegged to a second legal currency; and a plurality of validators determining governance of the multi-blockchain network, wherein the plurality of validators select the first token and the second token as system tokens, which are configured to be used as a transaction fee for the multi-blockchain network, from among tokens issued by the plurality of parachains, wherein the first parachain is configured to generate a first transaction including a vote for a first blockchain account and having a first fee, and pay the first fee for the multi-blockchain network using the first token, wherein the second parachain is configured to generate a second transaction including a vote for a second blockchain account and having a second fee, and pay the second fee for the multi-blockchain network using the second token, wherein the infra relay chain is configured to collect the vote for the first blockchain account based on a first system token weight and the first fee, collect the vote for the second blockchain account based on a second system token weight and the second fee, and elect the plurality of validators based on the collected votes, and wherein the first token weight and the second token weight are set based on the first legal currency and second legal currency, respectively.

2. The multi-blockchain network of claim 1, wherein the plurality of parachains further includes a third parachain, wherein the third parachain is configured to issue a third token as a wrapped token of the first token, generate a third transaction including a vote for a third blockchain account and having a third fee, and pay the third fee for the multi-blockchain network using the third token, and wherein the infra relay chain is configured to collect a vote for the third blockchain account based on the first system token weight and the third fee.

3. The multi-blockchain network of claim 2, wherein the first parachain has a predetermined first parachain weight, wherein the second parachain has a predetermined second parachain weight, wherein the third parachain has a predetermined third parachain weight, and wherein the infra relay chain is configured to collect the votes for the first, second and third blockchain accounts based on the first, second and third parachain weights.

4. The multi-blockchain network of claim 2, wherein the infra relay chain is configured to set a first, second and third time weight configured to assign a higher weight to a more recently generated transaction for the first, second and third transactions, and collect the votes for the first, second and third blockchain accounts based on the first, second and third time weights of the first transaction, the second transaction, and the third transaction.

5. The multi-blockchain network of claim 2, wherein the third parachain is configured to issue a first amount of the third token, and wherein the first parachain is configured to burn or lock up the first amount of the first token.

6. The multi-blockchain network of claim 1, wherein information related to the first and second fees are included in a fee table managed by the infra relay chain.

7. The multi-blockchain network of claim 1, wherein the first token weight is set to 1, and wherein the second token weight is set to an exchange rate of the second legal currency against the first legal currency.

8. The multi-blockchain network of claim 1, wherein the infra relay chain is configured to calculate a first vote count for the first blockchain account by multiplying the first system token weight by the first fee, calculate a second vote count for the second blockchain account by multiplying the second system token weight by the second fee, add the first vote count and the second vote count to a pre-accumulated vote count, and elect the plurality of validators at predetermined periods.

* * * * *